(12) United States Patent
Chen

(10) Patent No.: US 8,201,023 B2
(45) Date of Patent: Jun. 12, 2012

(54) TEST OPTIMIZATION

(75) Inventor: Zhiqiang Chen, San Ramon, CA (US)

(73) Assignee: Salesforce.com, Inc., San Francisco, CA (US)

( * ) Notice: Subject to any disclaimer, the term of this patent is extended or adjusted under 35 U.S.C. 154(b) by 1 day.

(21) Appl. No.: 12/856,510

(22) Filed: Aug. 13, 2010

(65) Prior Publication Data
US 2012/0042208 A1 Feb. 16, 2012

(51) Int. Cl.
*G06F 11/00* (2006.01)
(52) U.S. Cl. .......................................... 714/32; 714/38.1
(58) Field of Classification Search .................... 714/32, 714/38.1
See application file for complete search history.

(56) References Cited

U.S. PATENT DOCUMENTS 7,334,162 B1 * 2/2008 Vakrat et al. ................. 714/38.1
2004/0230964 A1 * 11/2004 Waugh et al. ................. 717/168
* cited by examiner

*Primary Examiner* — Charles Ehne
(74) *Attorney, Agent, or Firm* — Ingrassia Fisher & Lorenz, P.C.

(57) ABSTRACT

A method for optimizing tests of a software application. The method includes determining a test run time for each test of a plurality of tests of a software application; and dividing the tests into a plurality of test groups. The method further includes assigning a worker system of a plurality of worker systems to each test group; and causing the worker systems to run the tests.

20 Claims, 3 Drawing Sheets

TEST OPTIMIZATION

CROSS REFERENCE TO RELATED APPLICATIONS

The following commonly owned, co-pending United States patents and patent application, including the present application, are related to each other. Each of the other patents/applications is incorporated by reference herein in its entirety: U.S. patent application Ser. No. 12/842,988 entitled "Testing a Software Application Used in a Database System," filed Jul. 23, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to testing a software application used in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Software applications used in the database system are used to facilitate data retrieval as well as to carry out other operations of the database system. To ensure proper and efficient operations of the database system, software applications need to be tested periodically. Unfortunately, testing a software application can be a slow, inefficient process. For example, there can be numerous (e.g., 100,000) automated tests to validate various features of a software application used a database system. Such an effort requires a large number of machines to perform the tests.

BRIEF SUMMARY

In accordance with embodiments, there are provided mechanisms and methods for optimizing tests of a software application. The method includes determining a test run time for each test of a plurality of tests of a software application; and dividing the tests into a plurality of test groups. The method further includes assigning a worker system of a plurality of worker systems to each test group; and causing the worker systems to run the tests.

While the present invention is described with reference to an embodiment in which techniques for optimizing tests of a software application may be implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for optimizing tests of a software application.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for optimizing tests of a software application will be described with reference to example embodiments.

System Overview

Figure 1:
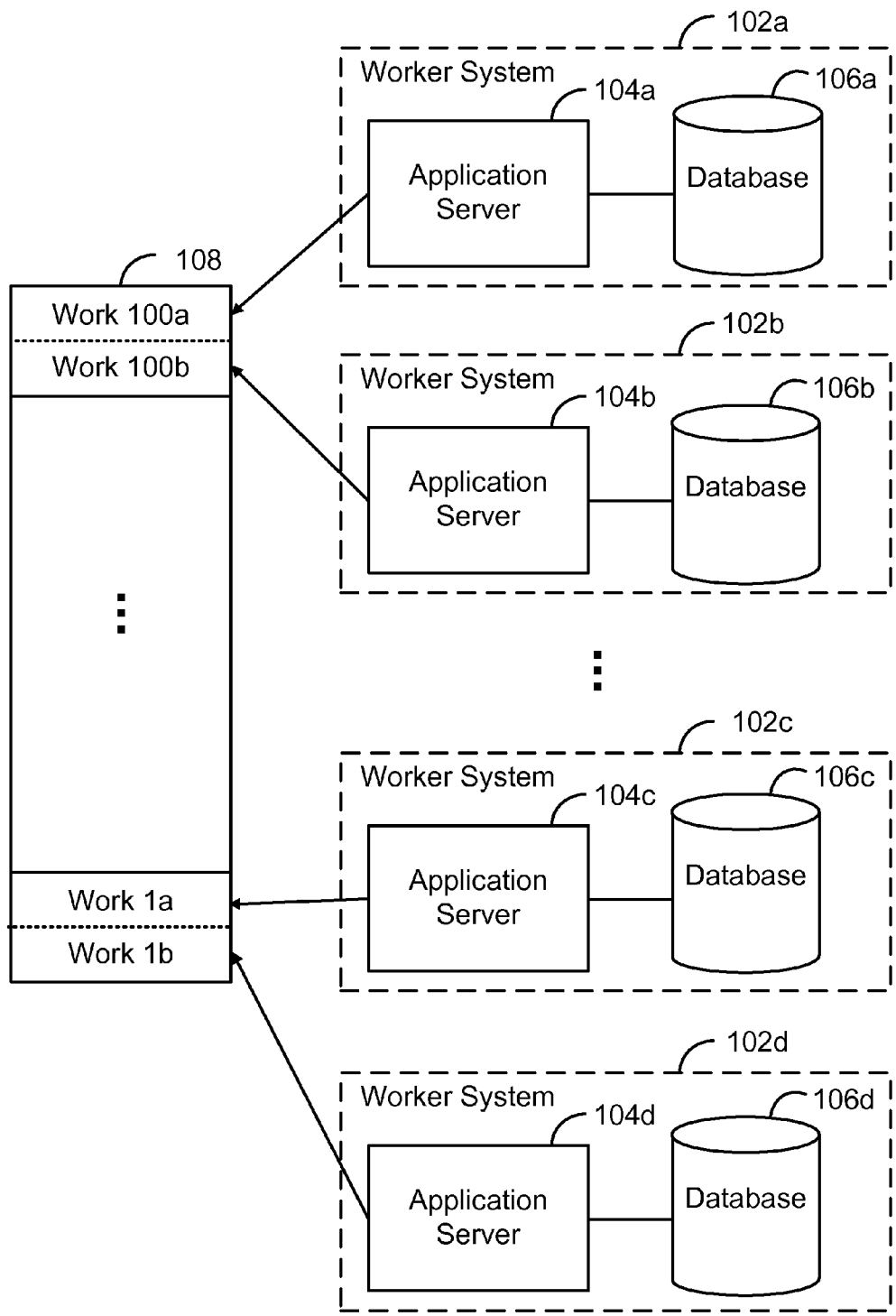
FIG. 1 illustrates a block diagram of an example environment for optimizing tests of a software application, and which may be used to implement embodiments described herein.

FIG. 1 illustrates a block diagram of an example environment 101 for optimizing tests of a software application, and which may be used to implement embodiments described herein. As FIG. 1 shows, the environment 101 includes multiple worker systems 102a, 102b, 102c, and 102d. In one embodiment, each worker system 102 includes an application server 104 and a database 106. The application servers are labeled 104a, 104b, 104c, and 104d, and the databases are labeled 106a, 106b, 106c, and 106d. In one embodiment, environment 101 also includes a work queue 108. Work queue 108 may be stored on any suitable database, storage location or computer-readable medium. In one embodiment, work queue 108 contains chunks of work (e.g., work 100), which are divided into sub-units (e.g., 100a and 100b). In one embodiment, each sub-unit may be referred to as a test group. In one embodiment, a test group may be defined as one or more tests that are performed by a worker system 102. For example, as FIG. 1 shows, worker system 102a executes one or more tests associated with work 100a, worker system 102b executes one or more tests associated with work 100b, etc.

For ease of illustration, only 4 worker systems 102 are shown. In one embodiment, each worker system shown (e.g., worker system 102a) may represent one or more worker systems. Also, in one embodiment, more worker systems that are not shown may be used to implement the embodiments described herein.

Figure 2:
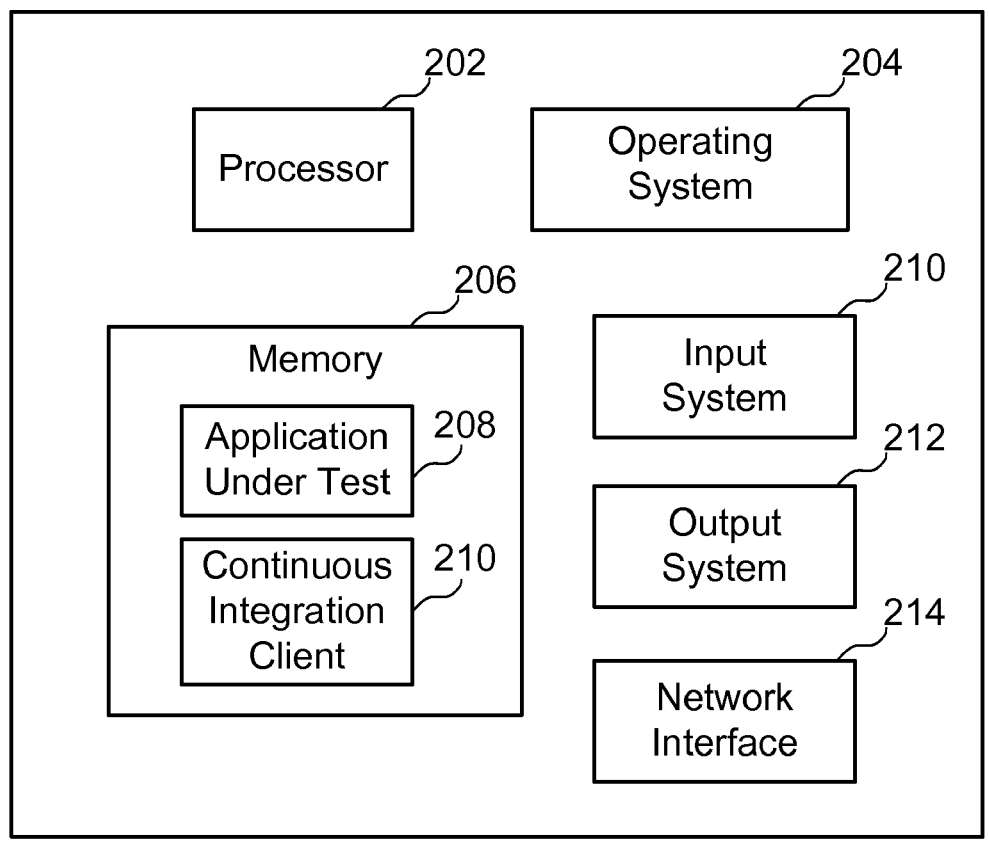
FIG. 2 illustrates a block diagram of a server, which may be used to implement embodiments described herein.

FIG. 2 illustrates a block diagram of a server 104, which may be used to implement embodiments described herein. As FIG. 2 shows, the application server 104 includes a processor 202, an operating system 204, a memory 206, an application under test 208, a continuous integration client 210, an input system 212, an output system 214, and a network interface 215. Application under test 208 and continuous integrated client 210 may be stored on memory 206 or on any other suitable storage location or computer-readable medium. Application under test 208 provides instructions that enable the processor 202 to perform the functions described herein, such as the steps described in FIG. 3. In one embodiment, server 104 may also be used to implement one or more of the application servers 104 of FIG. 1. In one embodiment, input system 212 may include input devices such as a keyboard, a mouse, etc., and other means for receiving information from a user and/or from other devices. Output system 214 may include output devices such as a monitor, a printer, etc., and other means for outputting information to a user and/or to other devices.

Various software applications are used in a database system to facilitate data retrieval and to carry out other operations of the database system described above. Software applications are tested to ensure proper and efficient operations of the database system. Embodiments described below optimize the testing of software applications by allocating groups of tests to worker systems based on historical test run times.

Figure 3:
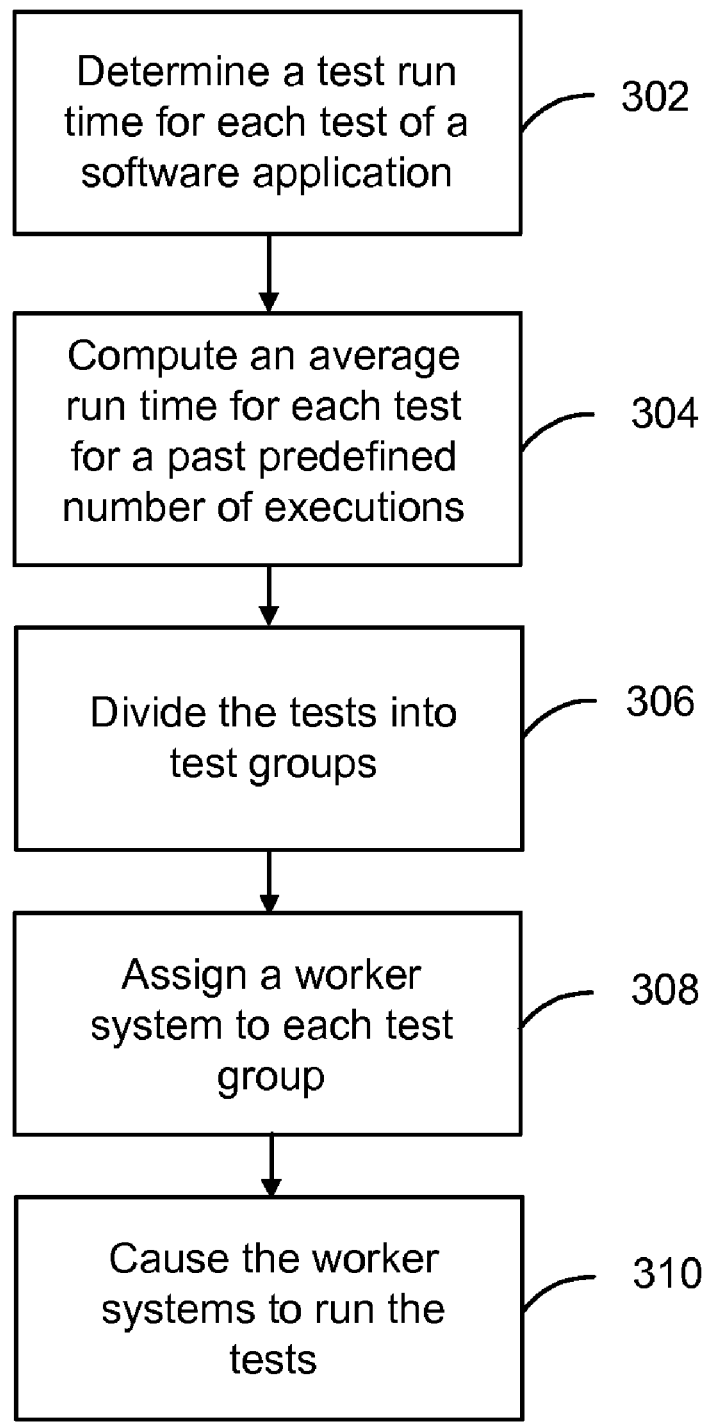
FIG. 3 illustrates an example simplified flow diagram for optimizing tests of a software application.

FIG. 3 shows an example simplified flow diagram for optimizing tests of a software application, according to one embodiment of the invention. The method is initiated in block 302, where system 101 determines a test run time for each test of a software application. While system 101 is described as performing the steps as described in the embodiments herein, any suitable component or combination of components of system 101 may perform the steps described. For example, the steps may be performed by processor 202 of FIG. 2, or by any other suitable processor or processors associated with system 101. In one embodiment, the test run times may be stored in memory 206 of FIG. 2, or in one or more of databases 106 of FIG. 1, or in any suitable storage device or location.

In block 304, system 101 computes an average test run time for each test for a past predefined number of executions (e.g., past 10 executions, past 50 executions, past 100 executions, etc.). In one embodiment, each test is uniquely identified (e.g., with an alpha-numeric number). In one embodiment, the number of executions may be the number of executions of the same test performed across multiple worker systems 102. This provides an average run time for each test in general. In one embodiment, the number of executions may be the number of executions of the same test performed on each worker system 102. This provides an average run time for each test on each worker system 102.

In block 306, system 101 divides the tests into test groups. In one embodiment, an algorithm makes two decisions in dividing the tests into test groups in order to minimize the amount of time needed for performing the tests. In one embodiment, for the first decision, system 101 may use the algorithm to determine the number of groups in which to divide the tests. In one embodiment, the number of test groups is pre-defined. In another embodiment, the number of groups may be based on (e.g., equal to) the number of worker systems 102 currently available. For example, if there will be 10 worker systems 102 currently available to perform the tests, system 101 may divided the tests into 10 test groups.

In another embodiment, the number of groups may be based on the number of worker systems 102 currently available and the number of worker systems 102 that will be available. In one embodiment, system 101 may use the algorithm to determine the optimal number of test groups to complete the tests by projecting different scenarios, each scenario having a different total number of test groups. In the different scenarios, a given test group will have different projected finishing times depending on the total number of test groups. In one embodiment, when determining the optimal number of test groups to use, system 101 projects the time required to complete the tests in each test group, where the test groups are run substantially simultaneously. For a given scenario, the projected time of the last test group to complete will be the time required to complete all of the tests for that scenario. In one embodiment, the scenario where the last test group completes the soonest (compared to the last test group in the other scenarios) is the scenario that determines how many test groups to use. In other words, the number of total test groups uses is the number used in the scenario projected to finish the soonest.

In one embodiment, system 101 may assign an offset value to one or more test groups, and may use the offset value to project the time required to complete the tests in a given test group. In one embodiment, the offset value may be based on a variety of factors. For example, in one embodiment, system 101 may assign an offset value to a given worker system 102 based on when the given worker system 102 is available to begin executing tests relative to when the other worker systems 102 are available to begin executing tests. For example, if a given worker system 102 is known to be available before the rest of the worker systems (e.g., by 1 minute), system 101 may assign the given worker system 102 a negative offset value (e.g., offset=−1). In one embodiment, system 101 would cause the worker system 102 having a "jump start" earlier than the rest to begin testing when ready.

In one embodiment, for the second decision, system 101 may use the algorithm to determine which tests go into each test group. In one embodiment, which tests go into which test group may be based on the amount of work in each test group to ensure a balance among test groups (e.g., the cumulative test run times is substantially equal among the test groups). In one embodiment, an assignment of each test to the test groups is based on test run times. Embodiments of such assignments are described in more detail below. In one embodiment, the test run times used to divide the tests is the average test run times.

The following further describes the algorithm that system 101 uses to divide the tests. In one embodiment, system 101 orders the tests by length of test run time. For example, in one embodiment, the first test in the ordered series is the test with the longest test run time, the second test in the series is the test with the second longest test run time, the third test in the series is the test with the third longest test run time, and so on.

Next, system 101 assigns the tests to the test groups in the same order from the test with the longest test run time to the test with the shortest test run time. For ease of illustration, in the following example, it is assumed that there are 9 tests and 3 test groups. In one embodiment, system 101 assigns the first test (with the longest test run time) to the first test group; assigns the second test (with the second longest test run time) to the second test group; and assigns the third test (with the third longest test run time) to the third test group. If there are more test groups, this part of the process would continue until each and every test group has at least one test assigned to it. In one embodiment, a given test is to be assigned to a test group, but two test groups have the same cumulative test run time (e.g., a tie), system 101 may assign the test to any one of the test groups (e.g., randomly, etc.).

Next, once each and every test group has at least one test signed to it, system 101 continues and assigns the forth test (which would be the remaining yet-to-be-assigned test having the longest test run time) to the test group that has the test having the shortest test run time assigned to it. This would be the third test group, in this example. System 101 then assigns the next test (e.g., test five) to the test group having the next shortest test run time assigned to it. This would be the second test group, in this example. System 101 then assigns the next test (e.g., test six) to the test group having the next shortest test run time assigned to it. This would be the first test group, in this example. System 101 then assigns the next test (e.g., test seven) to the first test group, assigns the next test (e.g., test eight) to the second test group, and finally assigns the next test (e.g., test nine) to the third test group.

Because of this algorithm, each test group would take substantially the same amount of time to complete its respective assigned tests.

In block 308, system 101 assigns a worker system 102 to a test group. In one embodiment, the number of worker systems 102 is the same as the number of test groups. In the example above, where would be three working systems and three test groups, each working system 102 is assigned to one test group.

In one embodiment, the worker systems 102 have substantially the same performance in terms of speed. Assuming the worker systems 102 perform at substantially the same speed, and assuming that the worker systems 102 start testing at the same time, each of the worker systems 102 will complete testing of its respective groups at substantially the same time due to the dividing step (block 306) described above.

In one embodiment, the offset values described above may also be used to when assigning worker systems 102 to test groups. For example, system 101 may assign a worker system 102 having a negative offset value (e.g., due to having a jump start) to a test group having cumulatively the longest test run times. Conversely, system 101 may assign a worker system 102 having a positive offset value (e.g., due to having a delayed start) to a test group having cumulatively the shortest test run times. As such, even though not all worker systems 102 begin execution of the tests in their respective test groups at the same time, all worker systems 102 should finish performing the tests in their respective test groups at substantially the same time.

In one embodiment, in addition to start time, system 101 may take into account other factors when assigning offset values. For example, in one embodiment, system 101 may assign an offset value to a given worker system 102 based on how much slower the given worker system 102 is compared to other worker systems 102. Speed differences may be determined based on historical performance (e.g., based on the average test run times of that given worker system 102, as described above). For example, if the given worker system 102 completes the same tests faster on average, system 101 may assign a negative offset value to that worker system 102. If the given worker system 102 completes the same tests more slowly on average, system 101 may assign a positive offset value.

Accordingly, how the tests are divided among multiple worker systems 102 may depend on resource requirement differences among the tests, performance differences among the worker systems 102, or a combination thereof.

In block 310, system 101 causes worker systems 102 to run the tests. In one embodiment, system 101 determines and stores a test run time for each test of a software application in order to update the average test run times. As such, embodiments described herein are self-adjusting in that the average test run times are continually updated.

Embodiments described herein provide various benefits. For example, embodiments can execute a large number of tests as fast as possible. Furthermore, embodiments minimize test run times by taking into account the starting time of worker systems as well as the speed of the worker systems. Furthermore, embodiments take in account historical test run times. Furthermore, embodiments evenly divide tests and assign the tests to multiple worker systems to enable the worker systems to complete the tests as soon as possible. Furthermore, embodiments provide offset value used assigning tests to multiple worker systems based on the projected starting time.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for optimizing tests of a software application, the method comprising:
    determining a test run time for each test of a plurality of tests of a software application;
    dividing the tests into a plurality of test groups;
    assigning a worker system of a plurality of worker systems to each test group based on an offset value assigned to the respective worker system, the offset value being based on a start time when the respective worker system is available to begin executing tests or a speed of the respective worker system; and
    causing the worker systems to run the tests.

2. The method of claim 1, further comprising computing an average test run time for each test for a past predefined number of executions.

3. The method of claim 1, further comprising:
    computing an average test run time for each test for a past predefined number of executions; and
    using the average test run times in the dividing step.

4. The method of claim 1, further comprising ordering the tests by length of test run time.

5. The method of claim 1, wherein a number of worker systems is the same as a number of test groups.

6. The method of claim 1, wherein assigning the worker system of the plurality of worker systems to each test group comprises assigning the plurality of worker systems to the plurality of test groups to complete the plurality of tests as soon as possible.

7. The method of claim 1, wherein assigning the worker system of the plurality of worker systems to each test group comprises assigning the plurality of worker systems to the plurality of test groups to complete the plurality of tests at substantially the same time.

8. The method of claim 1, wherein assigning the worker system of the plurality of worker systems to each test group comprises:
    assigning the worker system to a first test group having a longer test run time when the offset value is indicative of a jump start or a fast performance for the worker system; and
    assigning the worker system to a second test group having a shorter test run time when the offset value is indicative of a delayed start or a slow performance for the worker system.

9. The method of claim 4, wherein dividing the tests into the plurality of test groups comprises assigning a first test having a longest test run time of the ordered tests to a first test group of the plurality of test groups having a shortest test run time.

10. A non-transitory computer-readable storage medium having one or more instructions thereon for optimizing tests of a software application, the instructions when executed by a processor causing the processor to:
    determine a test run time for each test of a plurality of tests of a software application;
    divide the tests into a plurality of test groups;
    assign a worker system of a plurality of worker systems to each test group based on an offset value assigned to the respective worker system, the offset value being based on a start time when the respective worker system is available to begin executing tests or a speed of the respective worker system; and
    cause the worker systems to run the tests.

11. The computer-readable storage medium of claim 10, wherein the instructions further cause the processor to compute an average test run time for each test for a past predefined number of executions.

12. The computer-readable storage medium of claim 10, wherein the instructions further cause the processor to:
    compute an average test run time for each test for a past predefined number of executions; and
    use the average test run times in the dividing step.

13. The computer-readable storage medium of claim 10, wherein the instructions further cause the processor to order the tests by length of test run time.

14. The computer-readable storage medium of claim 10, wherein the instructions further cause the processor to assign offset values to one or more worker systems.

15. The computer-readable storage medium of claim 10, wherein a number of worker systems is the same as a number of test groups.

16. An apparatus for optimizing tests of a software application, the apparatus comprising:
    a processor including hardware that processes data, signals, or other information; and
    one or more stored sequences of instructions which, when executed by the processor, cause the processor to:
        determine a test run time for each test of a plurality of tests of a software application;
        divide the tests into a plurality of test groups;
        assign a worker system of a plurality of worker systems to each test group based on an offset value assigned to the respective worker system, the offset value being based on a start time when the respective worker system is available to begin executing tests or a speed of the respective worker system; and cause the worker systems to run the tests.

17. The apparatus of claim 16, wherein the one or more sequences of instructions cause the processor to compute an average test run time for each test for a past predefined number of executions.

18. The apparatus of claim 16, wherein the one or more sequences of instructions cause the processor to:

compute an average test run time for each test for a past predefined number of executions; and use the average test run times in the dividing step.

19. The apparatus of claim 16, wherein the one or more sequences of instructions cause the processor to order the tests by length of test run time.

20. The apparatus of claim 16, wherein to identify which changes caused the failures, the one or more sequences of instructions cause the processor to assign offset values to one or more worker systems.

\* \* \* \* \*